May 26, 1925. 1,539,360
C. KNUTSSON
INSECT DESTROYER
Filed June 9, 1924  2 Sheets-Sheet 1
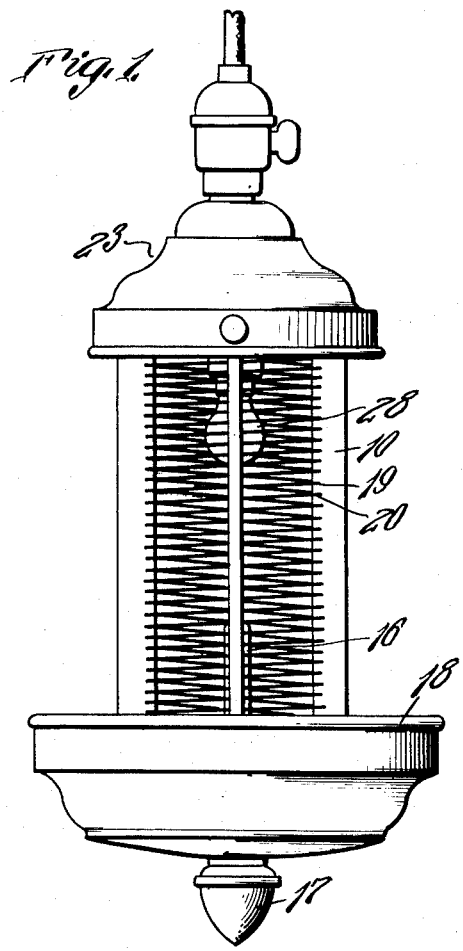
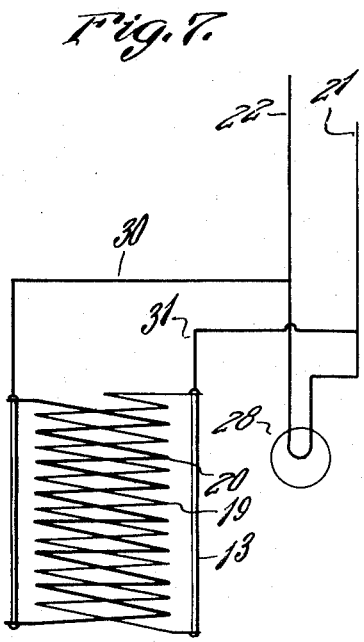
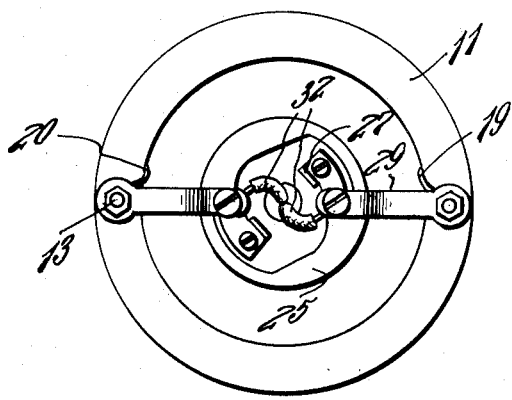
Carl Knutsson
INVENTOR
BY Victor J. Evans
ATTORNEY
WITNESS:

May 26, 1925.
C. KNUTSSON
INSECT DESTROYER
Filed June 9, 1924
1,539,360
2 Sheets-Sheet 2
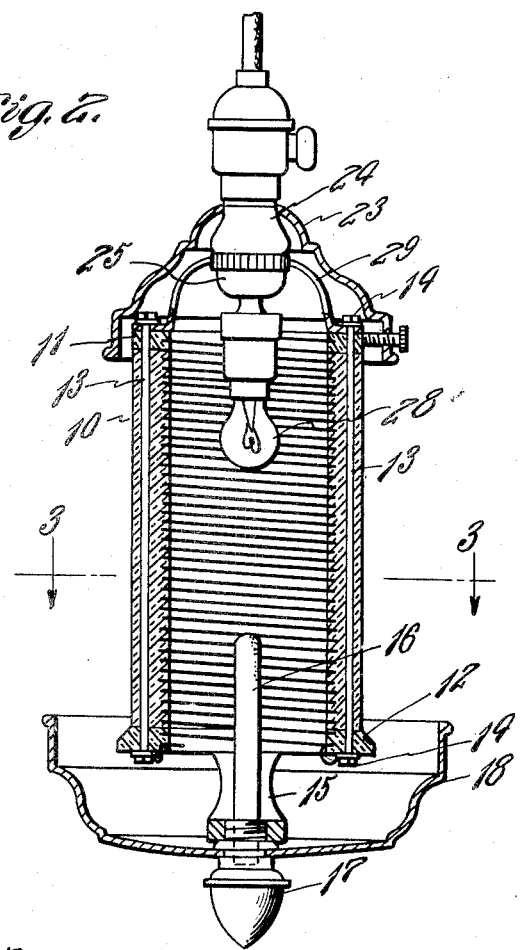
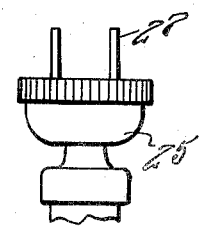
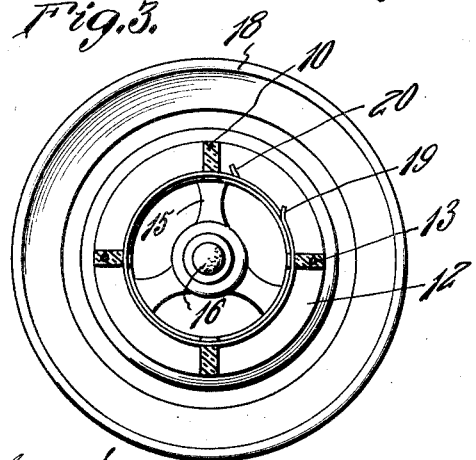
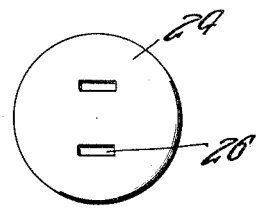
Carl Knutsson
INVENTOR
BY Victor J. Evans
ATTORNEY Patented May 26, 1925.

1,539,360

UNITED STATES PATENT OFFICE.

CARL KNUTSSON, OF CHARLESTON, SOUTH CAROLINA.

INSECT DESTROYER.

Application filed June 9, 1924. Serial No. 718,913.

*To all whom it may concern:*

Be it known that I, CARL KNUTSSON, a citizen of Sweden, residing at Charleston, in the county of Charleston and State of South Carolina, have invented new and useful Improvements in Insect Destroyers, of which the following is a specification.

This invention contemplates the provision of an insect destroyer, and embodies a plurality of coiled elements adapted to be arranged in parallelism, and in an electric circuit, so that when the body of the insect contacts said elements it is instantly killed, and allowed to drop into a receptacle arranged beneath and constituting a base for the device.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view in elevation of the device forming the subject matter of the invention, Figure 2 is a vertical sectional view therethrough, Figure 3 is a sectional view taken on line 3—3 of Figure 2, Figure 4 is a top plan view with the cap removed, Figure 5 is a plan view of one part of the electric light socket, Figure 6 is a view of the other part of the socket, Figure 7 is a diagrammatic view.

The device forming the subject matter of the present invention embodies a frame preferably made up of a plurality of spaced parallel standards 10 of some suitable insulated material. These standards are diametrically opposed as shown and are arranged between spaced upper and lower annuli 11 and 12 respectively. These component parts of the frame are connected together by rods 13, there being one of these rods passed through each standard 10, and through openings in said annuli, the ends of each rod being equipped with nuts 14. Depending from the lower annulus 12 is a three armed bracket 15 the center of which is formed with a threaded opening to receive a vertically disposed element 16 constituting a bait holder. This element preferably consists of a wooden rod adapted to be coated with honey or some other substance useful as a bait to attract the insects toward the device. The bait holder 16 is equipped at its lower end with a head 17 which may be of any ornamental design, and this head is utilized to support the receptacle 18 in a position beneath the frame of the device. The receptacle for this purpose is provided with a central opening through which the bait holder 16 is passed, and manifestly when the bait holder is threaded or screwed into the center opening of the bracket above referred to, the receptacle 18 is held associated with the frame. As illustrated this receptacle 18 has a diameter considerably greater than the diameter of the frame and surrounds the lower end of the frame as clearly shown in Figure 2, the construction and arrangement of the receptacle being such, that just as soon as the insects are killed by means of the device, the said insects fall into the receptacle. The insects are thus collected in the one place, and can be readily and conveniently disposed of when desired by simply removing the receptacle 18 from the frame. It will now be noted upon inspection of Figure 2 that each standard 10 is formed with a vertical series of grooves or notches to accommodate the various convolutions of an electric coil, there being two of these coils used and herein indicated at 19 and 20 respectively. The coils just referred to run parallel to one another as clearly shown in Figure 7, leaving but a small space between the adjacent convolutions of the respective coils, so that when an insect occupies said space its body contacts both of the adjacent convolutions of the said coils, thereby electrocuting and instantly killing the insect. Of course both of these coils are included in an electric circuit shown in Figure 7, current flowing from the wires 21 and 22 to the respective coils, but through the connecting rods 13 above referred to. The terminals of each coil are connected to one of the standards 10.

Clamped upon the upper end of the frame is a cap 23 which receives an electric light socket, the component parts 24 and 25 of which are clearly shown in Figures 5 and 6. The part 24 is provided with the usual slots 26 to receive the spaced contacts 27 carried by the part 25. An electric light bulb 28 is associated with this socket and wholly disposed within the coils above referred to, the light from the bulb being utilized to attract flies and other insects. The socket just referred to is supported by arms 29 which are terminally connected with the upper annulus 11 by means of the rods 13 and nuts 14, while the wires 30 and 31 which conduct the current to the coils are also connected with said rods 13 at the same point as shown in Figure 4. The upper end of these rods as shown in Figure 4 are connected with the wires that lead to the electric light bulb and indicated at 32. Manifestly when use of the device is desired, the current is turned on to energize the coils 19 and 20 respectively, and when the flies or other insects, being attracted by the light from the bulb 28, and also by the bait arranged on a rod 16 come in contact with the wire coils, they are instantly killed and subsequently fall into the receptacle 18. This is true whether or not the flies or insects contact the coils from the inner or outer sides thereof, the arms 15 of the bracket which depends from the lower annulus 12 being spaced a sufficient distance apart to allow the flies or other insects which enter the receptacle 18 and attempt to reach the bait on the rod 16, to enter the coils from the lower end of the frame. The invention is very simple in construction, while efficient for the purpose intended and can be manufactured and sold at a nominal cost.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. An insect destroyer comprising a frame including spaced standards, said frame being opened at both ends, a plurality of electric coils mounted thereon, and arranged in parallelism, said coils being used to kill an insect coming in contact therewith when the coils are energized, a cap covering the upper end of said frame and supported thereby, an electric light bulb suspended from said cap within the frame, a yoke suspended from said frame, a bait holder including a rod adapted to be coated with a sweet substance, said rod being supported by said yoke and projecting within the frame, a receptacle arranged beneath the frame and surrounding the lower end thereof, and into which the dead insects fall, and means for supporting the receptacle fixed relative to the frame by said bait holder.

2. An insect destroyer comprising a frame open at both ends, a plurality of electric coils mounted thereon and arranged in parallelism, said coils being used to kill an insect coming in contact therewith when the coils are energized, a cap covering the upper end of said frame and supported thereby, an electric light bulb suspended from the cap and arranged within the frame, a yoke suspended from the frame, and having a centrally threaded opening, a receptacle arranged beneath the frame and surrounding the latter, and into which the dead insects fall, a bait holder including a rod having a head, said rod being adapted to be passed through the opening in said yoke and through an opening in the bottom of the receptacle, to project within the frame, said rod including a threaded portion adapted to be threaded into said opening in the yoke, whereby the receptacle is clamped between the yoke and the head of said rod to hold the parts associated.

In testimony whereof I affix my signature.

CARL KNUTSSON.